US006140469A

United States Patent [19]
Shen et al.

[11] Patent Number: 6,140,469
[45] Date of Patent: *Oct. 31, 2000

[54] PROTEIN ISOLATE HAVING AN INCREASED LEVEL OF ISOFLAVONE COMPOUNDS AND PROCESS FOR PRODUCING THE SAME

[75] Inventors: Jerome L Shen, St. Louis; Balagtas Francisco Guevara, Sunset Hills; Frank Enrico Spadafora, St. Louis, all of Mo.

[73] Assignee: Protein Technologies International, Inc., St. Louis, Mo.

[ * ] Notice: This patent is subject to a terminal disclaimer.

[21] Appl. No.: 08/135,207

[22] Filed: Oct. 12, 1993

[51] Int. Cl.$^7$ .............................. A61K 38/02; C07K 1/30; C07K 14/415
[52] U.S. Cl. .............................. 530/370; 514/2; 530/378; 530/419; 530/420
[58] Field of Search .................................. 435/68.1, 125; 579/403; 514/2.8, 455, 456; 530/412, 414, 419, 420, 370, 377, 378

[56] References Cited

U.S. PATENT DOCUMENTS

| | | | |
|---|---|---|---|
| 3,949,085 | 4/1976 | Feuer et al. | 514/455 |
| 3,966,702 | 6/1976 | Carey | 530/378 |
| 4,157,984 | 6/1979 | Zilliken | 252/407 |
| 4,163,746 | 8/1979 | Feuer et al. | 549/403 |
| 4,218,489 | 8/1980 | Zilliken | 426/545 |
| 4,232,122 | 11/1980 | Zilliken | 435/52 |
| 4,264,509 | 4/1981 | Zilliken | 549/403 |
| 4,309,344 | 1/1982 | Walsh | 530/370 |
| 4,366,082 | 12/1982 | Zilliken | 252/403 |
| 4,366,248 | 12/1982 | Zilliken | 435/125 |
| 4,390,559 | 6/1983 | Zilliken | 426/545 |
| 4,428,876 | 1/1984 | Iwamura | 530/370 |
| 4,478,856 | 10/1984 | Adler-Nissen et al. | 435/68.1 |
| 4,841,077 | 6/1989 | Ito et al. | 549/402 |
| 4,960,908 | 10/1990 | Ito et al. | 549/403 |
| 5,248,765 | 9/1993 | Mazer et al. | 530/372 |
| 5,726,034 | 3/1998 | Bryan et al. | 435/68.1 |
| 5,763,389 | 6/1998 | Shen et al. | 514/2 |

OTHER PUBLICATIONS

Proceedings of the American Association for Cancer Research, vol. 34, Mar. 1993, Abstracts 999 and 3310.

"Genistein and Biochanin A I–hibit the Growth of Human Prostate Cancer Cells But Not The Epidermal Growth Factor Receptor Tyrosin Autosphosphorylation" by Peterson and Barnes; The Prostate, 22:335–345 (1993).

"Soybean Inhibit Mammary Tumors in Models of Breast Cancer" by Barnes et al; Mutagens and Carcinogens in the Diet, pp. 239–253 (1990).

"Genistein Inhibition of the Growth of Human Breast Cancer Cells: Independence from Estrogen Receptors and the Multi–Drug Resistance Gene" by Peterson and Barnes; Biochemical and Biophysical Research Communications, vol. 179, pp. 661–667 (Aug. 30, 1991).

"Genistein, a Specific Inhibitor of Tyrosine Specific Protein Kinases" by Akiyama et al; The Journal of Biological Chemistry, vol. 262, 12, pp. 5592–5595; 1987.

"Mechanisms of Action in NIH–3T3 Cells of Genistein, An Inhibitor of EGF Receptor Tyrosin Kinase Activity" by Linassier et al; Biochemical Pharmacology, vol. 39, No. 1, pp. 187–193 (1990).

"The Role of Soy Products in Reducing Risk of Cancer" by Messina and Barnes; Journal of the National Cancer Institute, vol. 83, No. 8, pp. 541–545 (1991).

Effect of Genistein on Topoisomerase Activity and on the Growth of [VAL 12] Ha–ras Transformed NIH 3T3 Cells by Okura, et al.; Biochemical and Biophysical Research Communications, vol. 157, No. 1, pp. 183–189 (1988).

Induction of Mammalian Topoisomerase II Dependent DNA Cleavage by Nonintercalative Flavonoids, Genistein and Orobol by Yamashita, et al; Biochemical Pharmacology, vol. 39, No. 4, pp. 737–744 (1990).

Soybean Utilization (1987) pp. 64–66.

Soybeans: Chemistry and Technology (1978) pp. 187–188.

*Primary Examiner*—Jeffrey E. Russel
*Attorney, Agent, or Firm*—Richard B. Taylor

[57] ABSTRACT

The present invention relates to the production of an isoflavone enriched vegetable protein isolate in which the weight ratio of material to extractant is controlled and washing of the acid precipitated protein curd is avoided or minimized to provide an increased level of isoflavones in the protein isolate.

8 Claims, No Drawings

PROTEIN ISOLATE HAVING AN INCREASED LEVEL OF ISOFLAVONE COMPOUNDS AND PROCESS FOR PRODUCING THE SAME

The present invention relates to an isoflavone enriched vegetable protein isolate and a process for producing the same.

Isoflavones occur in a variety of leguminous plants, including vegetable protein materials such as soybeans. These compounds for purposes of the present invention generally include daidzin, 6OAC-daidzin, daidzein, genistin, 6OAC genistin, genistein, glycitin, biochanin-A, formononetin and coumestrol. Typically these compounds are associated with the inherent, bitter flavor of soybeans and in the production of commercial products, such as isolates and concentrates, the focus has been to remove these materials. For example, in a conventional process for the production of a soy protein isolate, in which soy flakes are extracted with an aqueous alkaline medium, much of the isoflavones are solubilized in the extract and remain solubilized in the whey which is usually discarded following acid precipitation of the protein to form an isolate. Residual isoflavones left in the acid precipitated protein isolate are usually removed by exhaustive washing of the isolate.

It has recently been recognized that the isoflavones contained in vegetable proteins such as soybeans may inhibit the growth of human cancer cells, such as breast cancer cells and prostate cancer cells as described in the following articles: "Genistein Inhibition of the Growth of Human Breast Cancer Cells: Independence from Estrogen Receptors and the Multi-Drug Resistance Gene" by Peterson and Barnes, *Biochemical and Biophysical Research Communications*, Vol. 179, No. 1, p. 661–667, Aug. 30, 1991; "Genistein and Biochanin A Inhibit the Growth of Human Prostrate Cancer Cells but not Epidermal Growth Factor Receptor Tyrosine Autophosphorylation" by Peterson and Barnes, *The Prostate* 22: 335–345 (1993) and "Soybeans Inhibit Mammory Tumors in Models of Breast Cancer" by Barnes et al. *Mutagens and Carcinogens in the Diet* p. 239–253 (1990).

The above interest in isoflavones have noted a need for protein materials, suitable for administration in a diet, which are rich in these compounds, which previous processes for the production of commercial protein materials have made great efforts to remove.

It is therefore an object of the present invention to provide an isoflavone enriched protein isolate and a process for producing the same. This and other objects are specifically achieved in the detailed description of the present invention set forth below.

SUMMARY OF THE INVENTION

The present invention relates to an isoflavone enriched vegetable protein isolate and a process for producing the same comprising extracting a vegetable protein material with an aqueous extractant having a pH above about the isoelectric point of the protein material to produce an aqueous extract of protein and isoflavones. The pH of the aqueous extract is then adjusted to about the isoelectric point of the protein material in order to precipitate the protein material. The precipitated protein material is then separated and further washing of the precipitate is either avoided or minimized to prevent removal of residual isoflavones and provide an isoflavone enriched isolate. Additionally, since the isoflavones are readily solubilized in the aqueous extractant used to solubilize the protein, specific weight ratios of protein material to water are employed to maximize solubilization of the isoflavones during extraction.

For purposes of the present invention, the isoflavones of interest have the following general formula.

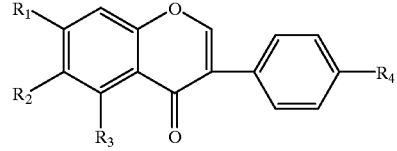

wherein R1, R2, R3; and R4 may be selected from the group consisting of H, OH, and OCH$_3$ as well as glucosides of these compounds. Specifically, these compounds and glucosides thereof which have been isolated from vegetable protein materials includes daidzin, 6OAC-daidzin, daidzein, genistin, 6OAC-genistin, genistein, glycitin, biochanin A, formononetrin and commestrol. Preferred isoflavones in the present invention for purposes of isolate enrichment include daidzin, 6OAC-daidzin, daidzein, genistin, 6OAC-genistin, and genistein.

DESCRIPTION OF THE PREFERRED EMBODIMENTS

Although the present invention will be described with respect to soybean products, and the process is particularly suited for production of an isoflavone enriched isolate from soybean materials, nevertheless the present process is generally applicable to the production of protein isolates from a variety of vegetable protein sources which contain isoflavones.

The starting material for the instant invention is soybean flakes, from which the oil has been removed by solvent extraction. The flakes are extracted with an aqueous extractant having a pH above about the isoelectric point of the protein material, preferably a pH of about 6.0–10.0 and a most preferred pH of about 6.7 to 9.7. Typical alkaline reagents may be employed, if desired, to elevate the pH of the aqueous extractant including sodium hydroxide, potassium hydroxide, and calcium hydroxide. The desired isoflavone compounds are typically solubilized in the aqueous extractant and, in order to maximize recovery of these compounds in the aqueous extract, the weight ratio of flakes to aqueous extract is controlled to specific levels in order to solubilize as much of the inherent isoflavones in the protein materials as is possible.

Extraction of the proteins and isoflavones can be carried out in a variety of ways including countercurrent extraction of the flakes at a weight ratio of flakes to aqueous extract of about 5:1 to 12:1 in which the initial extract is used to reextract the flakes and provide an aqueous extract of protein and isoflavones. Alternatively, a two step extraction process can be used in which the weight ratio of flakes to extractant in the initial step comprises about 8:1 and then a second extraction of the flakes with fresh extractant, takes place at a weight ratio of flakes to extractant of about 3:1 to about 6:1 so that the combined weight ratio of flakes to extractant in both steps does not exceed a total weight ratio of flakes to extractant of about 11:1 to 14:1.

Although, not critical, extraction may be carried out at temperatures up to about 120° F., for a period of time between about 5 and 60 minutes, preferably 15 minutes. The pH of the aqueous protein extract containing isoflavones described above, is then adjusted to about the isoelectric point of the protein by the addition of an edible acid, such as acetic, sulfuric, phosphoric, hydrochloric, or any other suitable acidic reagent. The isoelectric point for soy protein is generally between about 4.0 to 5.0 and preferably about 4.4 to 4.6. Adjustment of the pH to the isoelectric point precipitates the protein in the form of a curd. Typically, in the production of a conventional protein isolate the acid precipitated protein is separated from the remaining aqueous extract, described as the whey, and then is washed or treated to remove residual flavors. The washed isolate is then dewatered to form a dried isolate having a protein content, on a dry basis, which exceeds 90%. Extensive washing has often been used to remove undesirable flavors, which have been attributed to various "phenolic" compounds in soybeans such as the isoflavones.

In the present invention, washing of the precipitated protein material is either avoided entirely or minimized in order to substantially reduce removal of the isoflavones from the protein precipitate to thereby provide an isoflavone enriched isolate. For example by avoiding or minimizing washing of the precipitated protein material the recovery of isoflavones in the dried protein isolate can be more than doubled. Washing of the acid precipitated protein with water is therefore avoided completely or is limited to a single washing with water during which the weight ratio of water to starting protein material is between about 2:1 to 4:1. This lack of washing of the acid precipitated curd, provides an isolate enriched with the desired isoflavones.

The acid precipitated protein is then dewatered by a combination of centrifugation or concentration and is dried in a conventional manner. The present invention is not intended to be limited by a particular means of dewatering, although it is preferred to use conventional drying techniques such as spray drying to form a dried isolate. Protein isolate produced in the above manner provide isolates which have increased amounts of isoflavones, compared to a conventional isolate as is illustrated in the following specific examples.

EXAMPLE 1

In order to illustrate the increased levels of isoflavones in protein isolates produced pursuant to the present invention, a conventional protein isolate and procedure for producing the same was first completed to show recovery of the desired isoflavones in a conventional process. 100 lbs. of defatted soybean flakes were placed in an extraction tank and extracted with 1,000 lbs. of water heated to 90° F. to which sufficient calcium hydroxide was added to adjust the pH to 9.7. This provided a weight ratio of water to flakes of 10:1. The flakes were separated from the extract and reextracted with 600 lbs. of aqueous extract having a pH of 9.7 and a temperature of 90° F. This second extraction step provided a weight ratio of water to flakes of 6:1. The flakes were removed by centrifugation, the first and second extracts combined and adjusted to a pH of 4.5 with hydrochloric acid. The acid precipitated curd is separated from the whey by centrifugation and then washed with water in a weight amount of seven times that of the starting material to provide a protein isolate. Analysis of the curd, whey, spent flakes and starting material was completed for genistin (which includes genistin, genistein, and 6OAC-genistin) and daidzin (which includes daidzin, daidzein, and 6OAC-daidzin). Analysis of these isoflavones was accomplished by the procedure described below:

PROCEDURE FOR MEASUREMENT OF TOTAL GENISTIN AND DAIDZIN 1. 0.25 g of soy product is weighed out and added to 20 ml of extraction solution consisting of 80 parts methyl alcohol, 10 parts water and 10 parts 3N HCl.
2. An additional 20 ml. of 4N HCl is added and the mix is stirred for 10 minutes.
3. The solution is refluxed with a condenser for one hour.
4. The solution is cooled, and filtered through Whatman #4 filter paper.
5. A 10 ml aliquot is removed to which is added 10 ml. of milli pore water and 0.4 ml. of acetic acid, and mixed.
6. Each solution is injected into an HPLC column and measured for the above isoflavone levels by UV absorption.

Analysis of the precipitated curd, soy whey, spent flakes and starting material for the above isoflavones is set forth in Table 1. The results are also shown as a percentage recovery of the noted isoflavones from the level contained in the starting material.

TABLE 1

| Material | Level (mg/gm dry basis) | | % Recovery | |
| --- | --- | --- | --- | --- |
| | Genistin | Daidzin | Genistin | Daidzin |
| Curd | 0.90 | 0.54 | 23% | 15% |
| Whey | 3.24 | 3.30 | 75% | 83% |
| Spent Flakes | 0.21 | 0.19 | 2% | 2% |
| Starting Material | 1.72 | 1.58 | | |

The above example clearly illustrates that the desired isoflavones, in a conventional process are mostly concentrated in the whey, which results in low levels of isoflavones in most commercial protein isolates.

EXAMPLE 2

100 lbs. of defatted soybean flakes were placed in an extraction tank and extracted in a continuous two stage countercurrent procedure with 800 lbs. of water heated to 90° F., to which sufficient calcium hydroxide was added to adjust the pH to 9.7. This provided a weight ratio of water to flakes of 8:1. The flakes were removed by centrifugation and the aqueous extract adjusted to a pH of 4.5 in order to precipitate the protein, which was then separated from the whey by centrifugation. Washing of the separated curd with water was avoided. Analysis of the curd, whey spent flakes and starting material was completed in a similar manner as described in Example 1. These results are listed in Table 2.

TABLE 2

| Material | Level (mg/gm dry basis) | | % Recovery | |
| --- | --- | --- | --- | --- |
| | Genistin | Daidzin | Genistin | Daidzin |
| Curd | 2.31 | 1.59 | 59% | 44% |
| Whey | 1.68 | 2.11 | 39% | 53% |
| Spent Flakes | 0.21 | 0.28 | 2% | 3% |
| Starting Material | 1.72 | 1.58 | | |

The recovery results described above show that the desired isoflavone level in the curd has been substantially increased as compared to Example 1 to thereby provide an isoflavone enriched soy protein isolate.

EXAMPLE 3

The acid precipitated curd was prepared as described in Example 2 except that following acid precipitation of the curd, the curd was washed with ambient temperature water equal to a weight ratio of two times the weight of the flakes.

Analysis was completed as described in Example 1 and the level of recovery of isoflavones is set forth in Table 3.

TABLE 3

| Material | Level (mg/gm dry basis) | | % Recovery | |
|---|---|---|---|---|
| | Genistin | Daidzin | Genistin | Daidzin |
| Curd | 2.03 | 1.37 | 52% | 38% |
| Whey | 1.94 | 2.35 | 45% | 59% |
| Spent Flakes | 0.31 | 0.28 | 3% | 3% |
| Starting Material | 1.72 | 1.58 | | |

The recovery results show a substantial increase in isoflavone recovery in the curd as compared to Example 1 to thereby provide an isoflavone enriched soy protein isolate.

EXAMPLE 4

The acid precipitated curd was prepared as described in Example 2 except that following acid precipitation, the curd was washed with ambient temperature water equal to a weight ratio of four times the weight of the flakes. The recovery of isoflavones from this procedure are listed in Table 4.

TABLE 4

| Material | Level (mg/gm dry basis) | | % Recovery | |
|---|---|---|---|---|
| | Genistin | Daidzin | Genistin | Daidzin |
| Curd | 1.80 | 1.12 | 46% | 31% |
| Whey | 2.20 | 2.63 | 51% | 66% |
| Spent Flakes | 0.31 | 0.28 | 3% | 3% |
| Starting Material | 1.72 | 1.58 | | |

While recovery data shows a substantial increase in isoflavone recovery in the curd as compared to Example 1, the recovery is less than is described in Example 3.

EXAMPLE 5

100 grams of defatted soybean flour was extracted with 800 grams of water at a temperature of 90° F. The slurry had a pH of 6.7. The slurry was stirred for five minutes and centrifuged to remove the spent flour. The extract was adjusted to a pH of 4.5 with hydrochloric acid and the curd separated from the soy whey by centrifugation for ten minutes. No washing of the curd took place. Recovery of the isoflavones in the various fractions was measured as described in Example 1 and is listed in Table 5.

TABLE 5

| Material | Level (mg/gm dry basis) | | % Recovery | |
|---|---|---|---|---|
| | Genistin | Daidzin | Genistin | Daidzin |
| Curd | 2.49 | 1.76 | 60% | 46% |
| Whey | 1.25 | 1.47 | 29% | 37% |
| Spent Flakes | 0.91 | 1.40 | 11% | 17% |
| Starting Material | 1.72 | 1.58 | | |

It may be seen the isoflavone levels in the curd were generally improved compared to that of Example 1.

EXAMPLE 6

100 g of defatted soy flour was extracted with 800 g of water at a temperature of 90° F. The pH was adjusted to 9.7 by the addition of calcium hydroxide. The slurry was stirred for 15 minutes and then centrifuged for five minutes to separate the extract. The spent flour was then extracted a second time by mixing the flour with 300 g of water for five minutes. The second extract was separated from the spent flake by centrifugation for five minutes. The first and second aqueous extracts were combined and the pH adjusted to 4.5, the isoelectric point of the protein. The acid precipitated curd was recovered by centrifugation and isoflavone recovery in the curd, whey and spent flake fractions measured as described in Example 1. The isoflavone recovery is listed in Table 6.

TABLE 6

| Material | Level (mg/gm dry basis) | | % Recovery | |
|---|---|---|---|---|
| | Genistin | Daidzin | Genistin | Daidzin |
| Curd | 2.23 | 1.48 | 57% | 41% |
| Whey | 1.77 | 2.27 | 41% | 57% |
| Spent Flakes | 0.21 | 0.19 | 2% | 2% |
| Starting Material | 1.72 | 1.58 | | |

It will be readily apparent to one skilled in the art that numerous changes and modifications may be made to the present invention as described herein.

What is claimed is:

1. A process for producing an isoflavone enriched protein isolate comprising:

(a) extracting a vegetable protein material containing isoflavone with an aqueous extractant having a pH above about the isoelectric point of said vegetable protein material to produce an aqueous extract of protein material and isoflavones;

(b) adjusting the pH of said aqueous extract to about the isoelectric point of said protein material in order to precipitate said protein material; and (c) separating said precipitated protein material and washing said precipitated protein material with water in an amount by weight which is less than about 4 times the weight of said vegetable protein material to provide an isoflavone enriched protein isolate.

2. A process as set forth in claim 1 wherein extraction is carried out at a pH of about 6.0–10.0.

3. A process as set forth in claim 2 wherein extraction is carried out at a pH of about 6.7 to 9.7.

4. A process as set forth in claim 1 wherein the pH of the extract is adjusted to about 4.4. to 4.6.

5. A process as set forth in claim 1 wherein said vegetable protein material is extracted with said extractant at a weight ratio of said extractant to said vegetable protein material of about 5:1 to 12:1.

6. A process as set forth in claim 1 wherein extraction of said vegetable protein material comprises a double extraction, so that the combined weight ratio of said extractant to said vegetable protein material from both extractions does not exceed a total weight ratio of about 11:1 to 14:1.

7. A process as set forth in claim 1 wherein said precipitated protein material is washed with water in an amount by weight which is less than about two times the weight of said vegetable protein material.

8. A process as set forth in claim 1 including the step of dewatering said isoflavone enriched protein isolate.

* * * * *